US011481368B2

(12) United States Patent
Saillet et al.

(10) Patent No.: US 11,481,368 B2
(45) Date of Patent: Oct. 25, 2022

(54) AUTOMATICALLY RANK AND ROUTE DATA QUALITY REMEDIATION TASKS

(71) Applicant: International Business Machines Corporation, Armonk, NY (US)

(72) Inventors: Yannick Saillet, Stuttgart (DE); Namit Kabra, Hyderabad (IN); Manish Anand Bhide, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 16/446,855

(22) Filed: Jun. 20, 2019

(65) Prior Publication Data

US 2020/0401565 A1 Dec. 24, 2020

(51) Int. Cl.
*G06F 16/30* (2019.01)
*G06F 16/215* (2019.01)
*G06N 20/00* (2019.01)
*G06F 16/2457* (2019.01)

(52) U.S. Cl.
CPC ...... *G06F 16/215* (2019.01); *G06F 16/24578* (2019.01); *G06N 20/00* (2019.01)

(58) Field of Classification Search
CPC .................. G06F 16/215; G06F 16/24578
USPC ........ 707/609, 687, 705, 769, 790, 813, 821
See application file for complete search history.

(56) References Cited

U.S. PATENT DOCUMENTS

| | | | |
|---|---|---|---|
| 8,984,360 B2 | 3/2015 | Al Za'noun | |
| 9,092,749 B2 | 7/2015 | Kern | |
| 10,970,414 B1* | 4/2021 | Lesner | G06F 21/602 |
| 2003/0167454 A1* | 9/2003 | Iordanov | G09B 23/28 |
| | | | 717/104 |
| 2007/0198312 A1* | 8/2007 | Bagchi | G06F 17/18 |
| | | | 705/7.41 |
| 2013/0055042 A1* | 2/2013 | Al Za'noun | G06Q 10/06395 |
| | | | 714/E11.023 |
| 2014/0114709 A1* | 4/2014 | Olsen | G06Q 40/12 |
| | | | 705/7.12 |
| 2016/0034502 A1* | 2/2016 | Dupey | G06F 16/215 |
| | | | 707/688 |
| 2019/0220695 A1* | 7/2019 | Nefedov | G06N 5/022 |
| 2019/0377975 A1* | 12/2019 | Pandit | G06K 9/6215 |

OTHER PUBLICATIONS

IBM, "Managing Data Quality Exceptions and Workflows", printed on Apr. 8, 2019, 4 pps., <https://www.ibm.com/support/knowledgecenter/en/SSZJPZ_11.7.0/com.ibm.swg.im.iis.event.doc/topics/dqec_overview.html>.
Ruiz, "Data Quality Remediation", SCRIBD, printed on May 29, 2019, 21 pps., <https://www.scribd.com/doc/17224826/Data-Quality-Remediation>.

\* cited by examiner

*Primary Examiner* — Sana A Al-Hashemi
(74) *Attorney, Agent, or Firm* — Stephanie L. Carusillo

(57) ABSTRACT

In an approach for automatically ranking and routing data quality remediation tasks, a processor analyzes a data set ingested by a repository to produce a set of data quality problems. A processor computes a score for each data quality problem of the set of data quality problems. A processor identifies a route to send each data quality problem of the set of data quality problems. A processor exports each data quality problem according to the score and the route.

19 Claims, 7 Drawing Sheets

AUTOMATICALLY RANK AND ROUTE DATA QUALITY REMEDIATION TASKS

BACKGROUND

The present invention relates generally to the field of data quality, and more particularly to automatically ranking and routing data quality remediation tasks.

Data quality refers to the condition of a set of values of qualitative or quantitative variables. There are many definitions of data quality, but data is generally considered high quality if it is fit for its intended uses in operations, decision making, and planning. Alternatively, data is deemed of high quality if it correctly represents the real-world construct to which it refers. Furthermore, apart from these definitions, as data volume increases, the question of internal data consistency becomes significant, regardless of fitness for use for any particular external purpose. Data cleansing may be required in order to ensure data quality.

SUMMARY

Aspects of an embodiment of the present invention disclose a method, computer program product, and computer system for automatically ranking and routing data quality remediation tasks. A processor analyzes a data set ingested by a repository to produce a set of data quality problems. A processor computes a score for each data quality problem of the set of data quality problems. A processor identifies a route to send each data quality problem of the set of data quality problems. A processor exports each data quality problem according to the score and the route.

DETAILED DESCRIPTION

Figure 1:
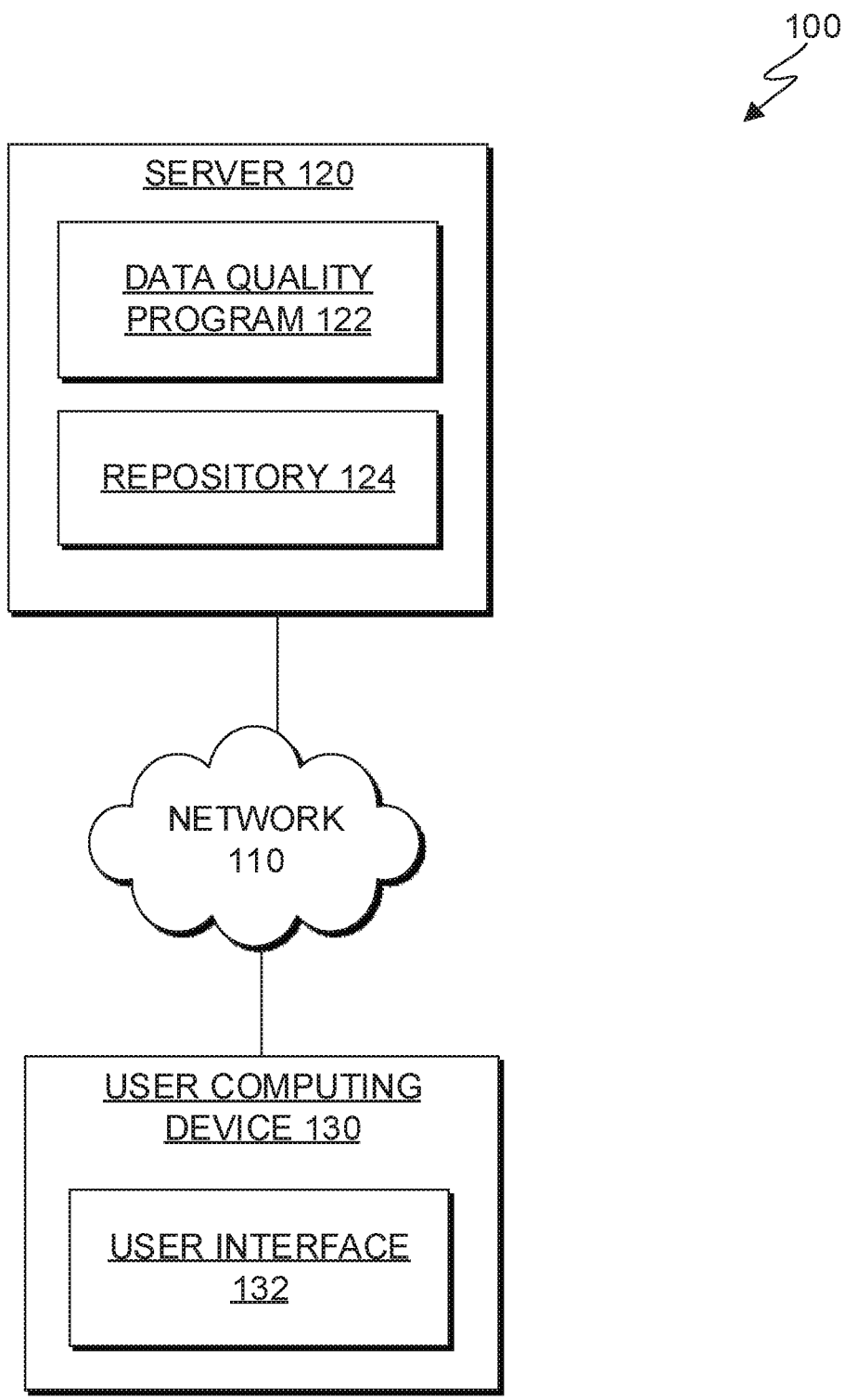
FIG. 1 depicts a block diagram of a data processing environment, in accordance with an embodiment of the present invention.

Embodiments of the present invention recognize that ensuring a certain level of data quality is critical for businesses as incorrect data being used in business processes could lead to wasting of financial resources (e.g., incorrect data being used for a marketing campaign can result in lost sales, incorrect data being used in analytics can lead to incorrect business decisions, or incorrect data can lead to violation of regulation rules and cause financial penalties). With the emergence of data lakes, the number of data sets whose data quality must be controlled increases exponentially making it impossible to inspect and cleanse each data set manually. A data lake is a storage repository that holds a vast amount of raw data in its native format until it is needed. Therefore, data quality measurement and resolution of any problems need to be automated as much as possible to optimize the limited human time available to inspect and clean the data.

Currently in the art, data can be analyzed during ingestion into a data lake, and such analysis can include detection of the nature and characteristics of the data (i.e., infer column properties, detect data classes, etc.), automatic tagging of data with business terms, and searching for particular data quality problems based on the tagging and characteristics of the data and based on defined data quality rules and policies. This analysis can potentially generate a very large number of data quality exceptions that can currently only be resolved by a human. Some examples of data quality problems can be missing mandatory information, incorrect information, rule violation, duplicated records, etc. Each data quality problem that needs to be resolved is called an exception. An exception is a type of data quality problem found in particular rows and/or columns of a particular data set. Each exception may result in a user workflow task assigned to a steward (an individual person) or a group of stewards. The steward accepting the task takes a remediative action to resolve the problem and then closes the exception.

Embodiments of the present invention recognize that the time the stewards have is limited while the number of exceptions increases with the number of new data sets ingested by the data lake. Embodiments of the present invention also recognize that not all data quality problems and not all data on which these problems have been detected have equal importance. Some data sets may play an important role because those data sets are used for analytic processes, reports, or as a source to extract transform load (ETL) processes producing further data sets used by other processes. Other data sets may be less important because those data sets are not used by the business yet or because the nature of the data is not critical for the business. Some types of problems may be important for one certain type of data while not important on another type of data. At the same time, some types of problems may be easy to resolve while other types of problems may require a lot of time for a steward to resolve. Therefore, embodiments of the present invention provide a system for automatically ranking and routing data quality exceptions based on their relevance and the expected cost of resolution, so that the limited time the stewards have can be used on the most important tasks.

For each data quality problem/exception that could be resolved by a steward, embodiments of the present invention compute (1) a score that can be used to rank the priority of resolution of each exception and (2) a suggested route/assignment that will optimize the time of the steward.

Embodiments of the present invention compute the score based on an assessment of the importance/relevance of the problem and the cost of resolving that problem. Embodiments of the present invention do an assessment of the importance/relevance of the problem by assessing the importance of the data set and the relevance of the detected type of problem for the type of data in that data set. Embodiments of the present invention assess the importance of the data set by looking at the data lineage to find out where and how the data set is used, as well as a business classification of the data set or assets derived from the data set and eventual policies associated with the business classification or the assets themselves. Embodiments of the present invention assess the relevance of the detected type of problem for the type of data by evaluation the data quality rules defined by the business and match them with the business classifications of the data.

Embodiments of the present invention compute the route based on trained machine-learning models that predict how fast each steward can resolve a type of problem, the actual backlog of each steward, and by grouping exceptions whose resolutions require the same skill or same input information.

Embodiments of the present invention allow the computed score and route to be dynamic as the usage of a data set or the workload of a steward changes. For example, a data set may be analyzed at the time of its ingestion with data quality problems identified, but the computed rank is low because the data set is not in use yet. At a later time, when data analysts start using the data set, the ranking of its data quality problems should increase to reflect the increase of importance of the data set. At another time, the policies and data quality rules defined by a business may change, and therefore, the ranking should change.

Embodiments of the present invention provide a workflow for when a new data set is ingested into the system. Embodiments of the present invention analyze the data set to detect data properties, to classify/tag the data, and to detect data quality problems and identify exceptions. For each exception, an importance of resolution of the data quality problem is computed as a score and is a function of (e.g., a weighted average) a relevance of the data quality problem and an expected cost of resolution of the data quality problem. For each exception, trained models for predicting the optimal steward for an assignment are applied to produce a recommended route for the exception. Embodiments of the present invention may present the scores and routes for each exception to a user. Embodiments of the present invention may dispatch the tasks to the respective stewards based on the scores and routes for each exception.

The present invention will now be described in detail with reference to the Figures.

FIG. 1 depicts a functional block diagram illustrating data processing environment 100, in accordance with an embodiment of the present invention. FIG. 1 provides only an illustration of one embodiment of the present invention and does not imply any limitations with regard to the environments in which different embodiments may be implemented. In the depicted embodiment, data processing environment 100 includes server 120 and user computing device 130 interconnected over network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between server 120 and user computing device 130. Data processing environment 100 may include additional servers, computers, or other devices not shown.

Server 120 operates as a computing device that can execute data quality program 122 and house repository 124. Server 120 may be a management server, a web server, or any other electronic device or computing system capable of running a program and receiving and sending data. In some embodiments, server 120 may be a laptop computer, tablet computer, netbook computer, personal computer (PC), a desktop computer, a smart phone, or any programmable electronic device capable of communicating with another computing device (not shown) via network 110. In other embodiments, server 120 may represent a server computing system utilizing multiple computers as a server system, such as in a cloud computing environment. In the depicted embodiment, server 120 comprises data quality program 122 and repository 124. In other embodiments, server 120 may include additional components (not shown). Server 120 may include components as described in further detail in FIG. 4.

Data quality program 122 operates as a program for ranking and routing data quality remediation tasks. In an embodiment, data quality program 122 analyzes a data set to detect data properties, to classify/tag the data, and to detect data quality problems and identify exceptions. For each exception, data quality program 122 computes an importance of resolution of the data quality problem as a score that is a function of (e.g., a weighted average of) a relevance of the data quality problem and an expected cost of resolution of the data quality problem. For each exception, data quality program 122 applies trained models, which are trained to predict an optimal steward for an assignment, to produce a recommended route for the exception. In one embodiment, data quality program 122 presents the exceptions ranked and with respective score and route through a user interface. In another embodiment, data quality program 122 dispatches the ranked tasks to the respective steward's computing device based on the scores and routes for each exception. In the depicted embodiment, data quality program 122 resides on server 120. In other embodiments, data quality program 122 may reside on another computing device (not shown), provided that data quality program 122 has access to repository 124 via network 110.

Repository 124 operates as a data lake for data sets ingested by server 120. A data lake is a storage repository that can hold structured and unstructured data in its native format until the data is needed. Repository 124 can be implemented with any type of storage device capable of storing data and configuration files that can be accessed and utilized by server 120, such as a database server, a hard disk drive, or a flash memory. In an embodiment, repository 124 is accessed by data quality program 122, server 120, and/or user computing device 130 to store data. In another embodiment, repository 124 is accessed by data quality program 122, server 120, and/or user computing device 130 to access the data. In the depicted embodiment, repository 124 resides on server 120. In other embodiments, repository 124 may reside on another computing device (not shown), provided that data quality program 122 has access to repository 124 via network 110.

User computing device 130 operates as a computing device with a user interface. In some embodiments, user computing device 130 may be a management server, a web server, or any other electronic device or computing system capable of running a program and receiving and sending data. In some embodiments, user computing device 130 may be a laptop computer, tablet computer, netbook computer, personal computer (PC), a desktop computer, a smart phone, or any programmable electronic device capable of communicating with server 120 or another computing device (not shown) via network 110. In other embodiments, user computing device 130 may represent a server computing system utilizing multiple computers as a server system, such as in a cloud computing environment. In an embodiment, user computing device 130 can send and/or receive data from server 120 and data quality program 122. In the depicted embodiment, user computing device 130 comprises user interface 132. In other embodiments, user computing device 130 may include additional components (not shown). User computing device 130 may include components as described in further detail in FIG. 4.

User interface 132 operates as a local user interface on user computing device 130 of IoT monitoring program 122. In an embodiment, user interface 132 is a local mobile application user interface of data quality program 122. In an embodiment, user interface 132 enables a user to view ranked exceptions with corresponding scores and routes.

Figure 2:
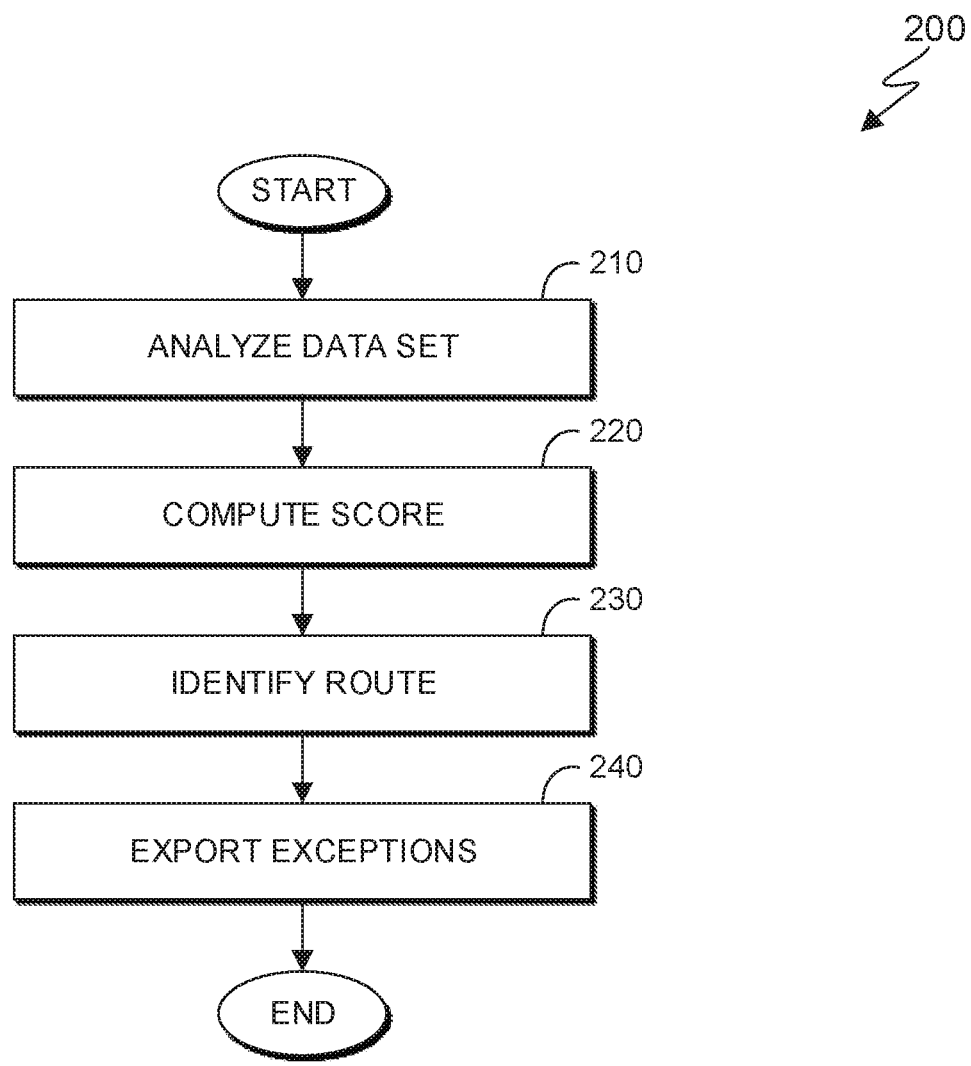
FIG. 2 depicts a flowchart of the steps of a data quality program, in accordance with an embodiment of the present invention.

FIG. 2 depicts a flowchart 200 of the steps of data quality program 122, in accordance with an embodiment of the present invention. In an embodiment, data quality program 122 ranks and routes data quality remediation tasks. It should be appreciated that the process depicted in FIG. 2 illustrates one possible iteration of the process flow, which repeats for each data set received by repository 124.

In step 210, data quality program 122 analyzes a data set ingested by a data lake. In an embodiment, data quality program 122 analyzes a data set received and ingested by repository 124. In an embodiment, data quality program 122 analyzes the data set for characteristics of the data (e.g., infer column properties, detect data classes, etc.), classifies and/or tags the data set with business terms (i.e., city, customer ID, tax ID, etc., and e.g., a data set column "Acct" can be mapped to the business term "Account"), and searches for data quality problems based on the characteristics of the data, the tags in the data set, and defined data quality rules and/or policies. Data quality rules and/or policies represent a type of quality dimension that evaluates or validates specific conditions associated with a data source. Data quality rules and/or policies are bound to columns of a data set and/or associated with a data source (e.g., column 1 of a first data set has a rule requiring all rows in column 1 to contain a numeric seven-digit value). In an embodiment, data quality program 122 analyzes the data set to produce a set of data quality problems.

In step 220, data quality program 122 computes a score. In an embodiment, data quality program 122 computes a score for an importance of resolution of each data quality problem. In an embodiment, data quality program 122 computes a score that is used to rank the set of data quality problems by the importance of resolution of each data quality problem. In an embodiment, data quality program 122 computes the score as a function of a relevance for each data quality problem and an expected cost of resolution of each data quality problem. Computing the relevance for each data quality problem is further described as the second sub-process flow in FIG. 3B. Predicting the expected cost of resolution of each data quality problem is further described as the third sub-process flow in FIG. 3C. In an embodiment, data quality program 122 computes the score for each data quality problem using a weighted average of the relevance for the data quality problem ($DQ_{Relevance}$) and the expected cost of resolution of the data quality problem ($DQ_{Cost}$) with pre-defined weights (W1, W2) using Equation 1. In an embodiment, data quality program 122 enables a user to input the weights using user interface 132 on user computing device 130.

$$W1*DQ_{Relevance}+W2*DQ_{Cost}/W1+W2 \quad \text{(Equation 1)}$$

In step 230, data quality program 122 identifies a route. In an embodiment, data quality program 122 identifies a steward's computing device, such as user computing device 130, to route each data quality problem to for resolution. In an embodiment, data quality program 122 applies trained machine-learning models to identify a steward's computing device to route each data quality problem to for resolution. Applying the models to identify the route is further described as the fourth sub-process flow in FIG. 3D.

In step 240, data quality program 122 exports the set of data quality problems. In an embodiment, data quality program 122 presents the set of data quality problems ranked and with corresponding scores and routes through user interface 132 on user computing device 130. In an embodiment, data quality program 122 dispatches each data quality problem of the set of data quality problems based on the corresponding score and route to the respective steward's computing device, such as computing device 130.

Figure 3A:
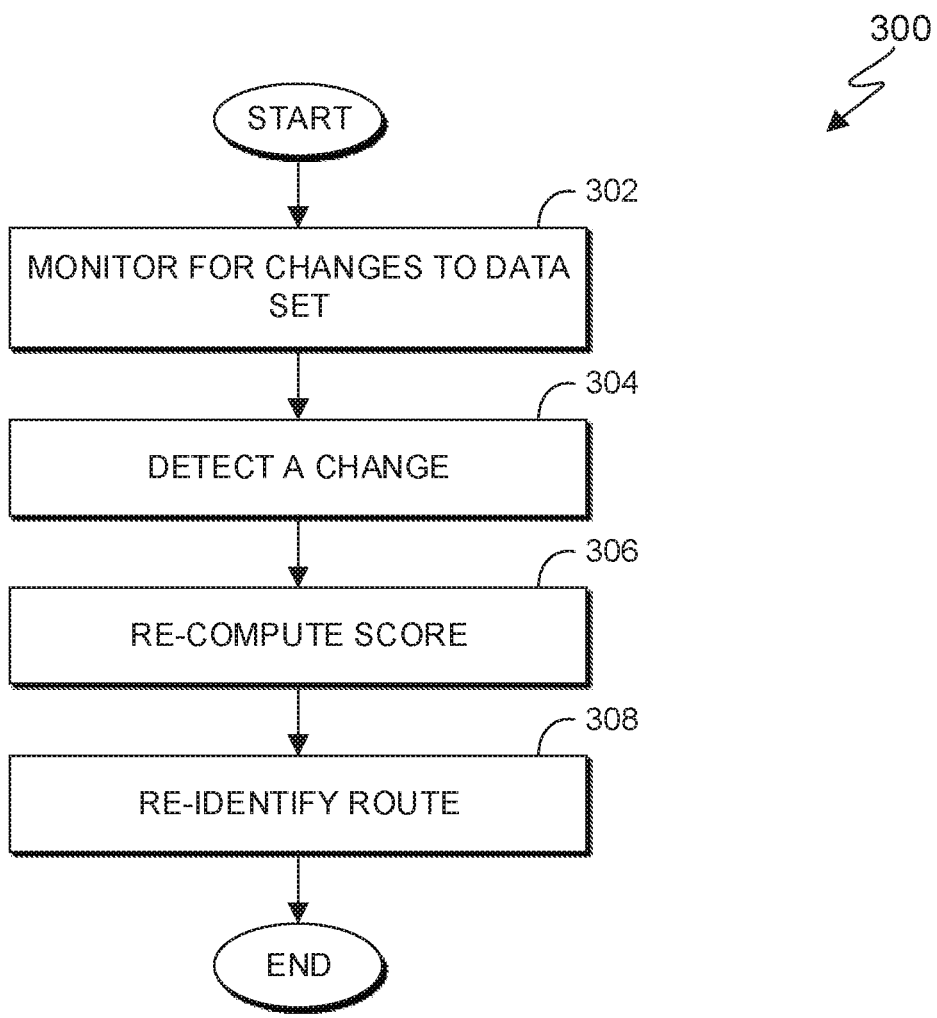
FIG. 3A depicts a flowchart of the steps of a first sub-workflow of data quality program, in accordance with an embodiment of the present invention.

FIG. 3A depicts a flowchart 300 of the steps of a first sub-process flow of data quality program 122 to account for changes to a data set usage and/or data quality rules and policies for a data set, in accordance with an embodiment of the present invention. It should be appreciated that the process depicted in FIG. 3A illustrates one possible iteration of the first sub-process flow, which repeats for each data quality problem.

In step 302, data quality program 122 monitors for changes to a data set. In an embodiment, data quality program 122 monitors for changes to usage of the data set and changes to data quality rules and policies for the data set.

In step 304, data quality program 122 detects a change. In an embodiment, data quality program 122 detects a change to the data set. For example, data quality program 122 detects that the data set has been used in an ETL flow or for a report. In another example, data quality program 122 detects that a data quality policy has been added or modified for the data set.

In step 306, data quality program 122 re-computes the score based on the change for impacted data quality problems. In an embodiment, data quality program 122 re-computes the score for each impacted data quality problem. In an embodiment, data quality program 122 re-computes the score for each impacted data quality problem similarly to step 220 above.

In step 308, data quality program 122 re-identifies the route based on the change for impacted data quality problems. In an embodiment, data quality program 122 re-identifies the route for each impacted data quality problem. In an embodiment, data quality program 122 re-identifies the route for each impacted data quality problem similarly to step 230 above.

Figure 3B:
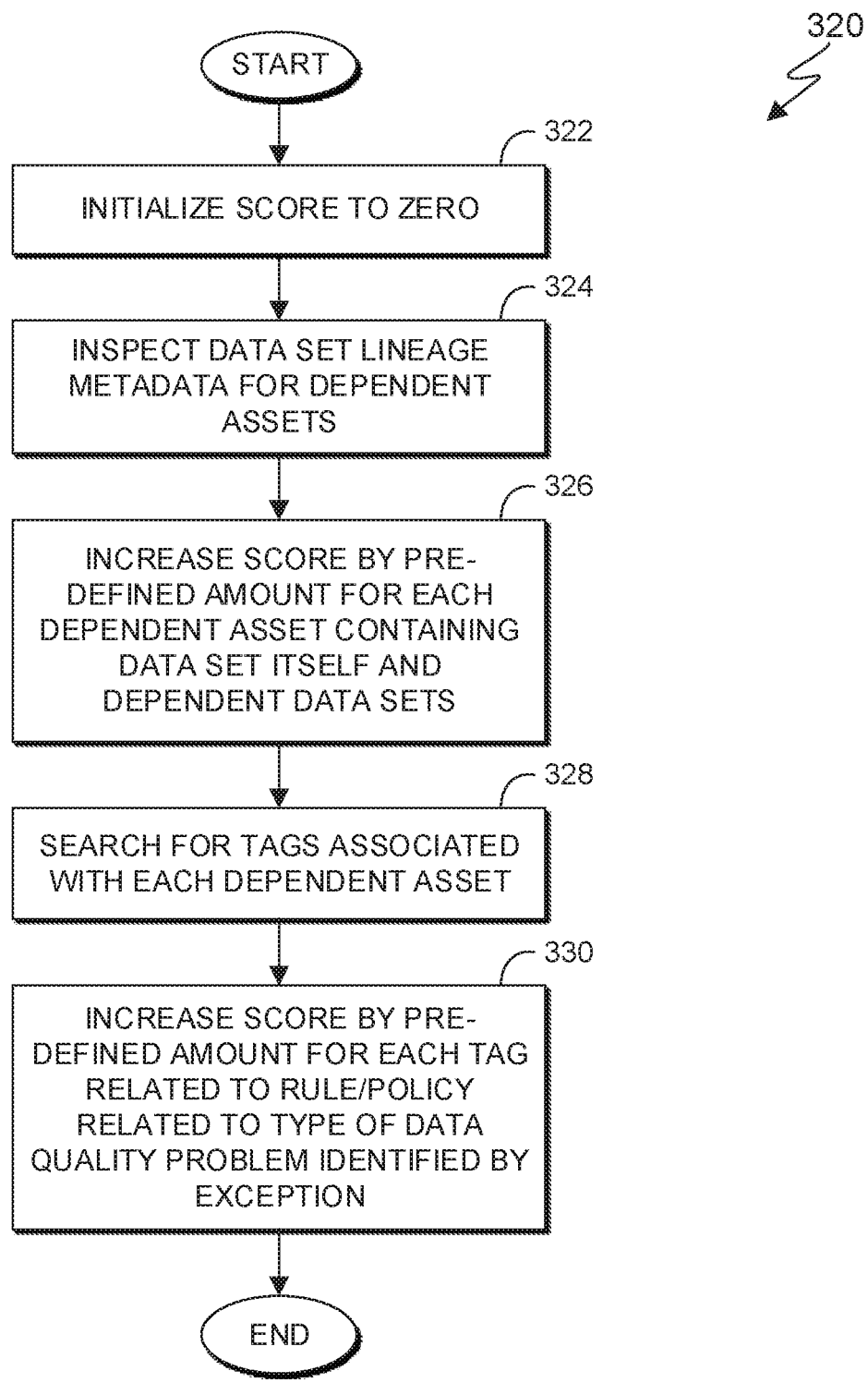
FIG. 3B depicts a flowchart of the steps of a second sub-workflow of data quality program, in accordance with an embodiment of the present invention.

FIG. 3B depicts a flowchart 320 of the steps of a second sub-process flow of data quality program 122 for computing the relevance of the data quality problem, in accordance with an embodiment of the present invention. It should be appreciated that the process depicted in FIG. 3B illustrates one possible iteration of the second sub-process flow, which repeats for each data quality problem.

In step 322, data quality program 122 initializes a relevance score to zero. In an embodiment, data quality program 122 begins the relevance score count at zero.

In step 324, data quality program 122 inspects data lineage metadata. Data lineage metadata specifies the data's origins, where the data moves over time, and what happens to the data as it goes through diverse processes. In an embodiment, data quality program 122 inspects the data lineage metadata for dependent assets that use the data set as a source and for direct or indirect links between the data set and rules/policies, tags/business terms, etc. In an embodiment, data quality program 122 finds the data lineage metadata with the data set in the data lake, repository 124. Dependent assets can be ETL flows consuming the data set, artifacts produced by the ETL flows such as subsequent data sets, reports using the data set, machine-learning models using the data set, and processes where the machine-learning models are used. In an embodiment, data quality program 122 creates a list of the dependent assets found in the data lineage metadata. In an embodiment, data quality program 122 inspects each dependent asset in the list to see if a dependent asset contains the data set itself and any dependent data sets.

In step 326, data quality program 122 increases the relevance score by a pre-defined amount for each dependent asset containing the data set itself and any dependent data sets. In an embodiment, data quality program 122 increases the relevance score by a pre-defined constant amount for each dependent asset in the list containing the data set itself and any dependent data sets.

In step 328, data quality program 122 searches for tags associated with each dependent asset. In an embodiment, data quality program 122 searches the list for tags of business terms associated with each dependent asset that would have been tagged when the data set was ingested into the data lake, i.e., repository 124, (step 210).

In step 330, data quality program 122 increases the relevance score by a pre-defined amount for each tag related to a rule or policy related to the type of data quality problem identified by the exception. In an embodiment, data quality program 122 increases the relevance score by a pre-defined constant amount for each tag related to a rule or policy related to the type of data quality problem identified by the exception. In another embodiment, data quality program 122 increases the relevance score by a pre-defined value, which is dependent on the rule or policy, for each tag related to a rule or policy related to the type of data quality problem identified by the exception.

Figure 3C:
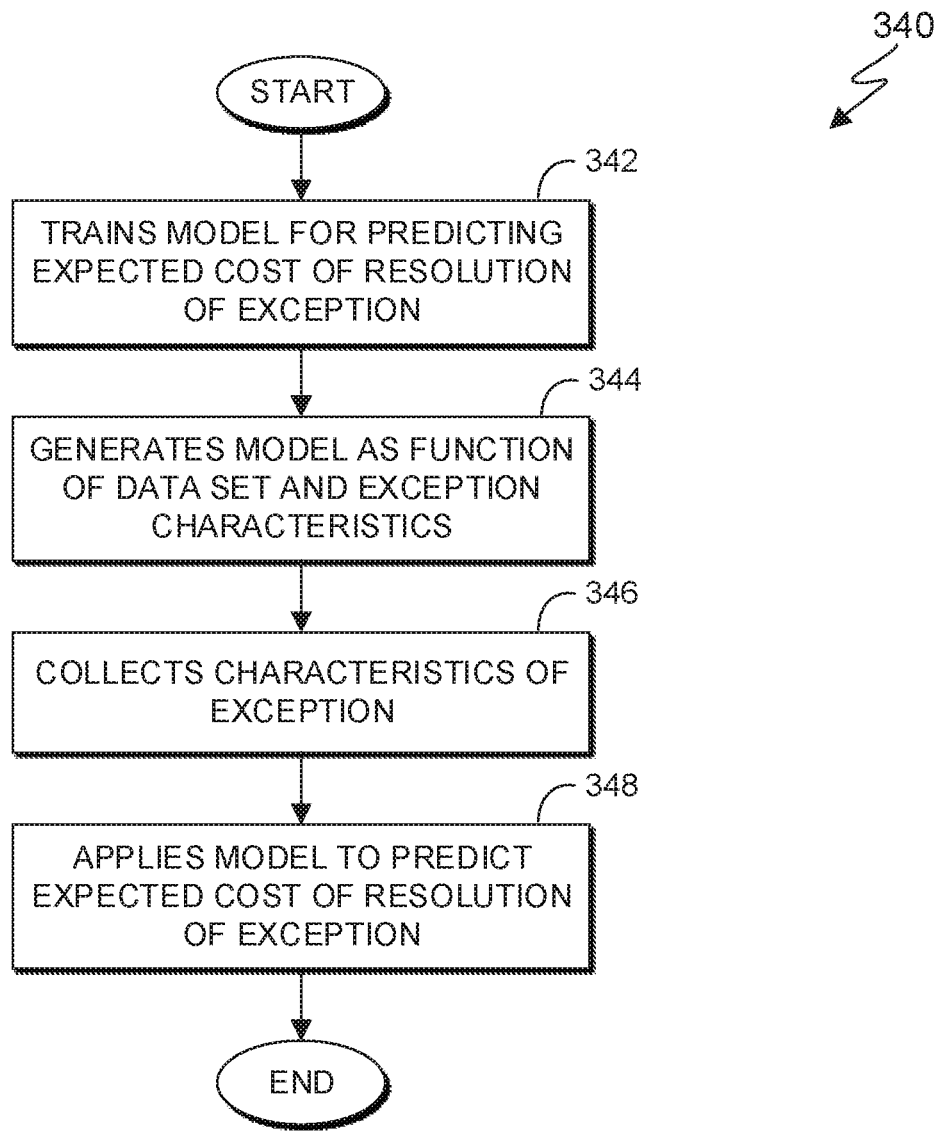
FIG. 3C depicts a flowchart of the steps of a third sub-workflow of data quality program, in accordance with an embodiment of the present invention.

FIG. 3C depicts a flowchart 340 of the steps of a third sub-process flow of data quality program 122 for predicting the expected cost of resolution of the data quality problem, in accordance with an embodiment of the present invention. It should be appreciated that the process depicted in FIG. 3C illustrates one possible iteration of the third sub-process flow, which repeats for each exception.

In step 342, data quality program 122 trains a machine-learning model, for predicting the expected cost of resolution of an exception, based on historical data for past exception resolutions. In an embodiment, data quality program 122 scans the past exception resolutions to retrieve (1) information about the cost of the resolution (e.g., time between the opening and closing of the task by a steward) and (2) information about the exception itself (i.e., information about the data set (i.e., tags, metrics (i.e., number of rows)), information about the data quality problem (i.e., problem type, number of occurrences, metadata of the columns where problem detected, etc.). Data quality program 122 trains the machine-learning model on historical data only on the first iteration of flowchart 340. In subsequent iterations, data quality program 122 adds any new completed exception resolutions to the machine-learning model.

In step 344, data quality program 122 generates the machine-learning model as a function of the data set and exception characteristics.

In step 346, data quality program 122 collects characteristics of the exception. In an embodiment, data quality program 122 collects characteristics of the exception (i.e., type of data quality problem, e.g., data class violations, data type violations, format violations, minimum/maximum value violations, missing values, inconsistent missing value representations, suspect values, correlation violations, duplicate values, and rule violations) from the data set.

In step 348, data quality program 122 applies the machine-learning model to predict the expected cost of resolution of the exception.

Figure 3D:
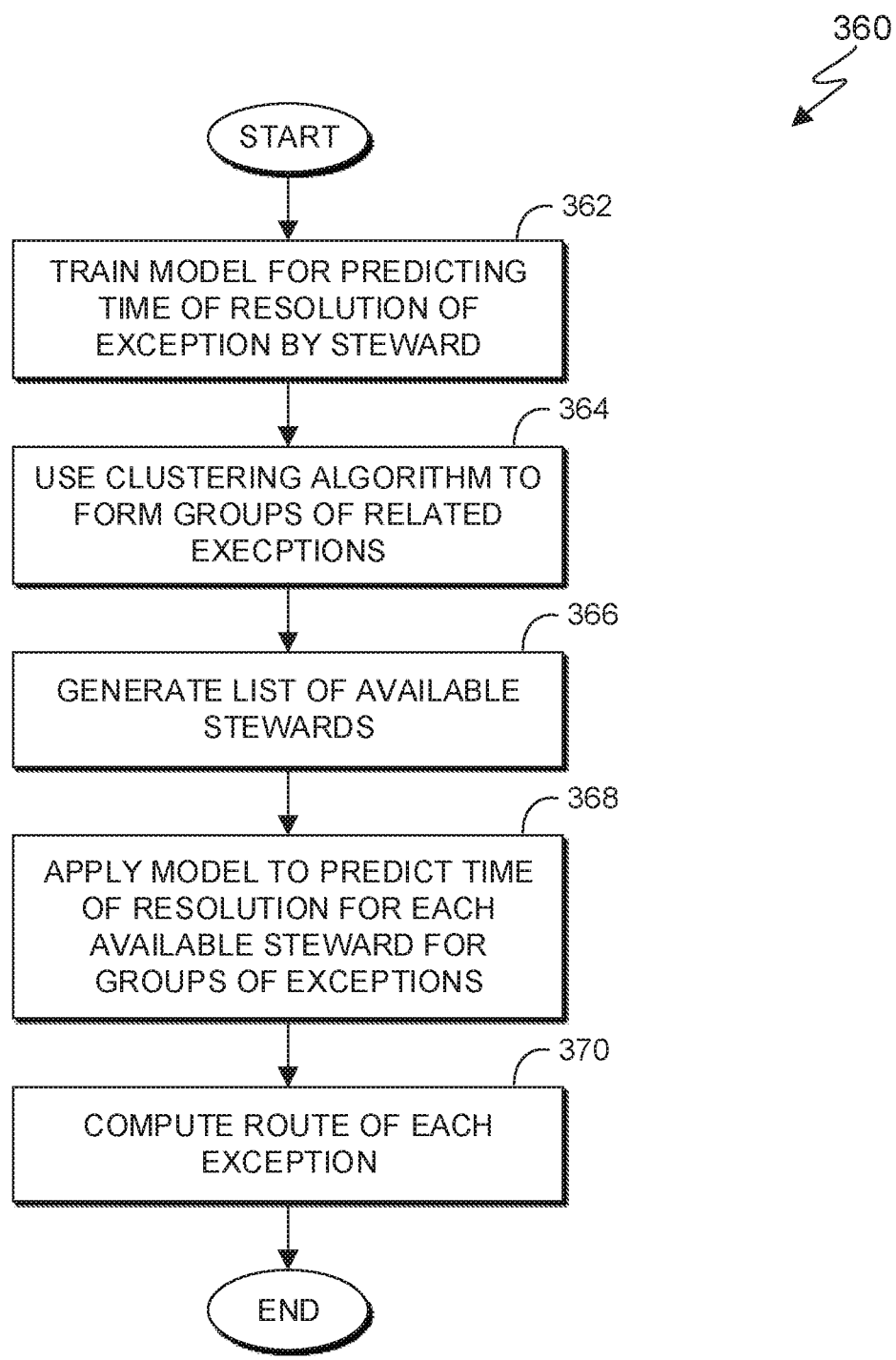
FIG. 3D depicts a flowchart of the steps of a fourth sub-workflow of data quality program, in accordance with an embodiment of the present invention.

FIG. 3D depicts a flowchart 360 of the steps of a fourth sub-process flow of data quality program 122 for producing a recommended route for the exception, in accordance with an embodiment of the present invention. It should be appreciated that the process depicted in FIG. 3D illustrates one possible iteration of the fourth sub-process flow, which repeats for each data quality problem.

In step 362, data quality program 122 trains a set of machine-learning models, for predicting a time of resolution of the exception by a steward, based on historical data of past exception resolutions. In an embodiment, data quality program 122 builds a model for each steward. In an embodiment, data quality program 122 scans the past exception resolutions to retrieve (1) information about the cost of the resolution (e.g., time between the opening and closing of the task by a steward), (2) information about the exception itself (i.e., information about the data set (i.e., tags, metrics (i.e., number of rows)), information about the data quality problem (i.e., problem type, number of occurrences, metadata of the columns where problem detected, etc.), and (3) information about the steward (i.e., domain expertise, cost of resolution). Data quality program 122 trains the set of machine-learning models on historical data only on the first iteration of flowchart 360. In subsequent iterations, data quality program 122 adds any new completed exception resolutions by each steward to the model for the respective steward.

In step 364, data quality program 122 uses a clustering algorithm to form groups of related exceptions. In an embodiment, data quality program 122 uses a clustering algorithm (i.e., k-means clustering algorithm) to form groups of relation exceptions. In an embodiment, data quality program 122 uses the characteristics of the exception (i.e., type of data quality problem) and the characteristics of the data set (i.e., data source, tags/classifications, number of columns) as the input data for the clustering algorithm.

In step 366, data quality program 122 generates a list of available stewards. In an embodiment, data quality program 122 generates a list of available stewards based on steward information (i.e., each steward's backlog). In an embodiment, data quality program 122 finds steward information in a stewardship center database (not shown).

In step 368, data quality program 122 predicts the time of resolution for each available steward for the groups of exceptions by using the models associated with the available stewards.

In step 370, data quality program 122 computes optimal dispatching of exceptions to minimize total time of resolution.

Figure 4:
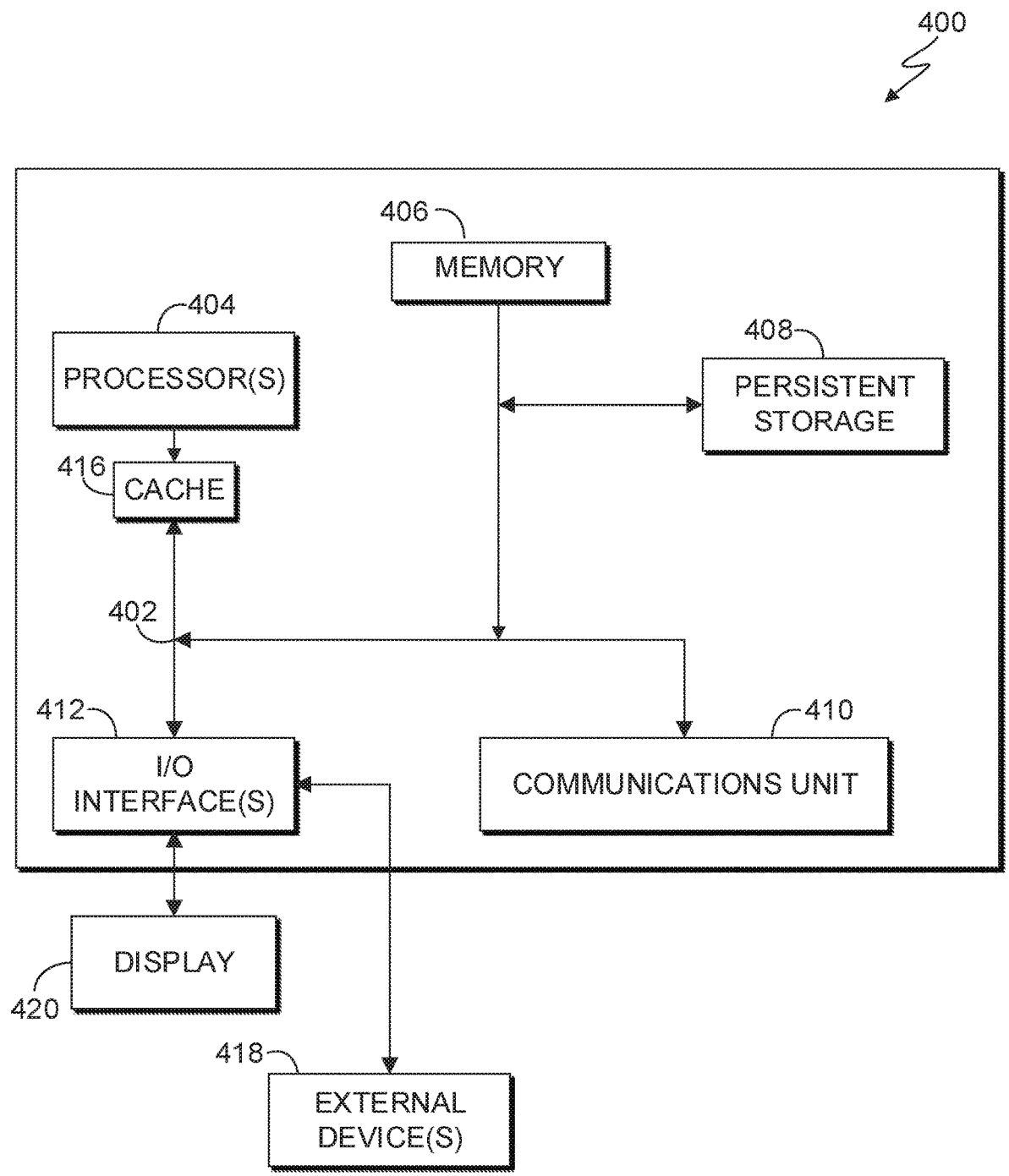
FIG. 4 depicts a block diagram of a server of data processing environment, in accordance with an embodiment of the present invention.

FIG. 4 depicts a block diagram of computer 400 suitable for server 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Data analysis program 122 may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Programs, such as data quality program 122, may be downloaded to persistent storage 408 through communications unit 410.

I/O interface(s) 412 allows for input and output of data with other devices that may be connected to server 120. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

Data quality program 122 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for automatically ranking and routing data quality remediation tasks, the computer-implemented method comprising:
analyzing, by one or more processors, a data set ingested by a repository to produce a set of data quality problems;
computing, by the one or more processors, a score for each data quality problem of the set of data quality problems as a function of a relevance of each data quality problem and an expected cost of resolution of each data quality problem, wherein the score is used to rank the set of data quality problems by the importance of resolution of each data quality problem, and wherein the expected cost of resolution for each data quality problem is predicted using a machine-learning model, trained on historical data of past data quality problem resolutions, that is a function of the data set and characteristics of a respective data quality problem;
identifying, by the one or more processors, a route to send each data quality problem of the set of data quality problems based on a backlog of each steward of the set of stewards, wherein each data quality problem is routed to a steward of the set of stewards to resolve the respective data quality problem; and
exporting, by the one or more processors, each data quality problem according to the respective score and the respective route.

2. A computer program product for automatically ranking and routing data quality remediation tasks, the computer program product comprising:
one or more computer readable storage media and program instructions stored on the one or more computer readable storage media, the program instructions comprising:
program instructions to analyze a data set ingested by a repository to produce a set of data quality problems;
program instructions to compute a score for each data quality problem of the set of data quality problems as a function of a relevance of each data quality problem and an expected cost of resolution of each data quality problem, wherein the score is used to rank the set of data quality problems by the importance of resolution of each data quality problem, and wherein the expected cost of resolution for each data quality problem is predicted using a machine-learning model, trained on historical data of past data quality problem resolutions, that is a function of the data set and characteristics of a respective data quality problem;
program instructions to identify a route to send each data quality problem of the set of data quality problems based on a backlog of each steward of the set of stewards, wherein each data quality problem is routed to a steward of the set of stewards to resolve the respective data quality problem; and
program instructions to export each data quality problem according to the score and the route.

3. A computer system for automatically ranking and routing data quality remediation tasks, the computer system comprising:
one or more computer processors;
one or more computer readable storage media;

program instructions stored on the computer readable storage media for execution by at least one of the one or more processors, the program instructions comprising:
program instructions to analyze a data set ingested by a repository to produce a set of data quality problems;
program instructions to compute a score for each data quality problem of the set of data quality problems as a function of a relevance of each data quality problem and an expected cost of resolution of each data quality problem, wherein the score is used to rank the set of data quality problems by the importance of resolution of each data quality problem, and wherein the expected cost of resolution for each data quality problem is predicted using a machine-learning model, trained on historical data of past data quality problem resolutions, that is a function of the data set and characteristics of a respective data quality problem;
program instructions to identify a route to send each data quality problem of the set of data quality problems based on a backlog of each steward of the set of stewards, wherein each data quality problem is routed to a steward of the set of stewards to resolve the respective data quality problem; and
program instructions to export each data quality problem according to the score and the route.

4. The computer-implemented method of claim 1, wherein analyzing the data set further comprises:
analyzing, by the one or more processors, the data set for data characteristics;
tagging, by the one or more processors, the data set with business terms;
identifying, by the one or more processors, a set of data quality rules; and
searching, by the one or more processors, for the set of data quality problems based on the data characteristics, the business terms, and the set of data quality rules.

5. The computer-implemented method of claim 1, wherein the score is a weighted average of the relevance and the expected cost of resolution with pre-defined weights.

6. The computer-implemented method of claim 1, wherein the route is a steward's computing device.

7. The computer-implemented method of claim 1, wherein identifying the route comprises:
applying, by the one or more processors, a trained machine-learning model to identify the respective steward's computing device to which to send each data quality problem.

8. The computer-implemented method of claim 1, wherein the repository is a data lake that holds structured and unstructured data in native format.

9. The computer-implemented method of claim 1, further comprising:
computing, by the one or more processors, the relevance for each data quality problem as a relevance score by:
initializing, by the one or more processors, the relevance score for the respective data quality problem to zero;
increasing, by the one or more processors, the relevance score by a pre-defined amount for each dependent asset found in data lineage metadata containing the data set itself and dependent data sets;
searching, by the one or more processors, for tags associated with each dependent asset; and
increasing, by the one or more processors, the relevance score by a second pre-defined amount for each tag related to a rule or policy related to a type of data quality problem of the respective data quality problem.

10. The computer program product of claim 2, wherein the program instructions to analyze the data set further comprise:
program instructions to analyze the data set for data characteristics;
program instructions to tag the data set with business terms;
program instructions to identify a set of data quality rules; and
program instructions to search for the set of data quality problems based on the data characteristics, the business terms, and the set of data quality rules.

11. The computer program product of claim 2, wherein the score is a weighted average of the relevance and the expected cost of resolution with pre-defined weights.

12. The computer program product of claim 2, wherein the route is a steward's computing device.

13. The computer program product of claim 2, wherein the program instructions to identify the route comprise:
program instructions to apply a trained machine-learning model to identify the respective steward's computing device to which to send each data quality problem.

14. The computer system of claim 3, wherein the program instructions to analyze the data set further comprise:
program instructions to analyze the data set for data characteristics;
program instructions to tag the data set with business terms;
program instructions to identify a set of data quality rules; and
program instructions to search for the set of data quality problems based on the data characteristics, the business terms, and the set of data quality rules.

15. The computer system of claim 3, wherein the score is a weighted average of the relevance and the expected cost of resolution with pre-defined weights.

16. The computer system of claim 3, wherein the program instructions to identify the route comprise:
program instructions to apply a trained machine-learning model to identify the respective steward's computing device to which to send each data quality problem.

17. The computer-implemented method of claim 5, wherein the relevance of each data quality problem is based on a set of data lineage metadata for the data set, and wherein the set of data lineage metadata is inspected for a set of dependent assets that use the data set as a source.

18. The computer program product of claim 11, wherein the relevance of each data quality problem is based on a set of data lineage metadata for the data set, and wherein the set of data lineage metadata is inspected for a set of dependent assets that use the data set as a source.

19. The computer system of claim 15, wherein the relevance of each data quality problem is based on a set of data lineage metadata for the data set, and wherein the set of data lineage metadata is inspected for a set of dependent assets that use the data set as a source.

* * * * *